Aug. 10, 1943.  E. PIQUEREZ  2,326,168
APPARATUS FOR TESTING AND INDICATING THE CONDITION OF VEHICLE BRAKES
Filed Jan. 14, 1939  5 Sheets-Sheet 3

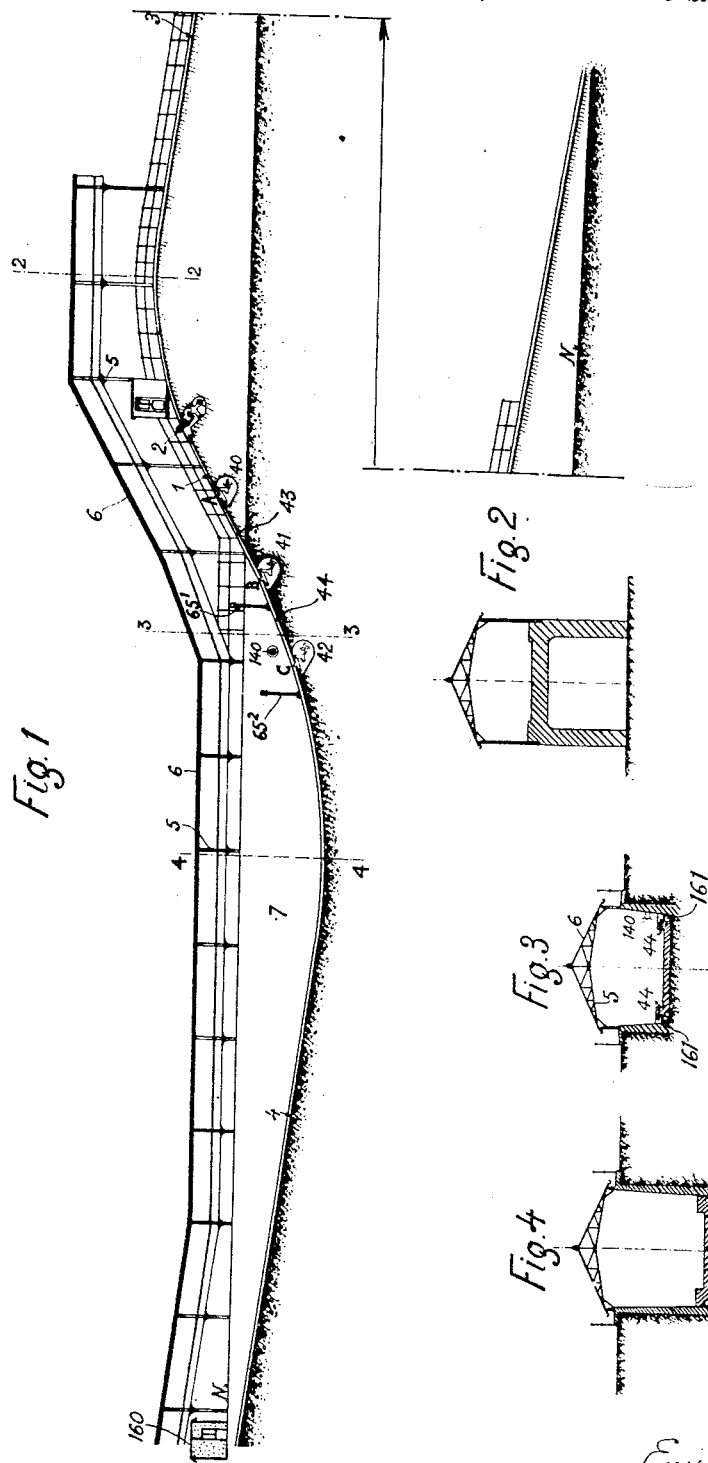

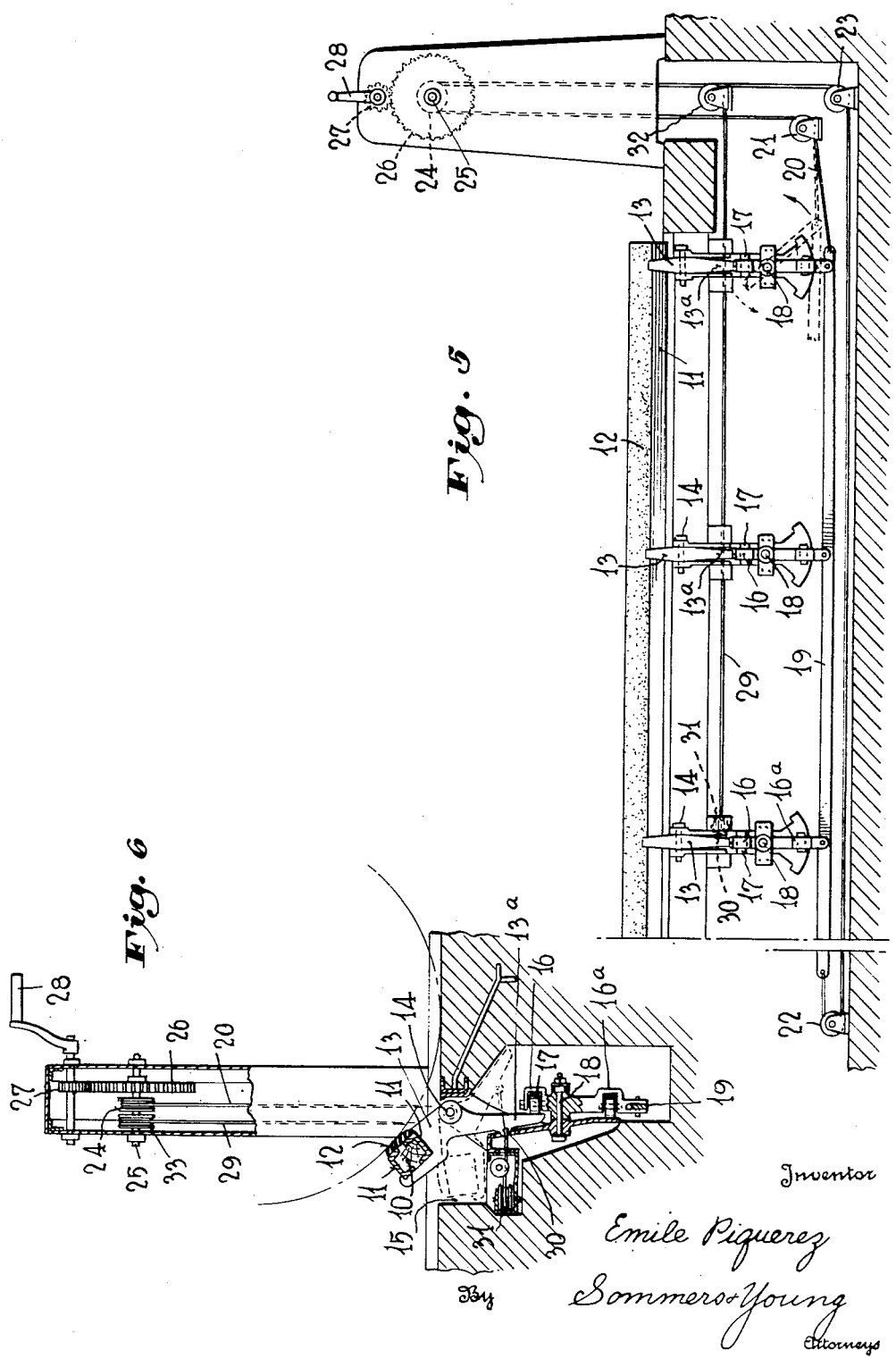

Inventor
Emile Piquerez
By Sommers & Young Attys

Aug. 10, 1943.   E. PIQUEREZ   2,326,168
APPARATUS FOR TESTING AND INDICATING THE CONDITION OF VEHICLE BRAKES
Filed Jan. 14, 1939   5 Sheets-Sheet 4
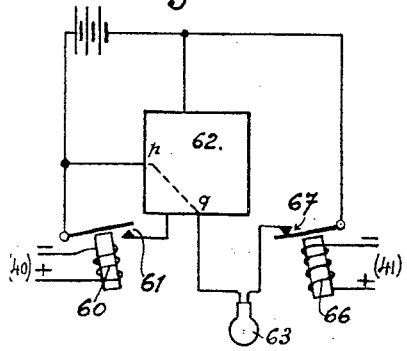
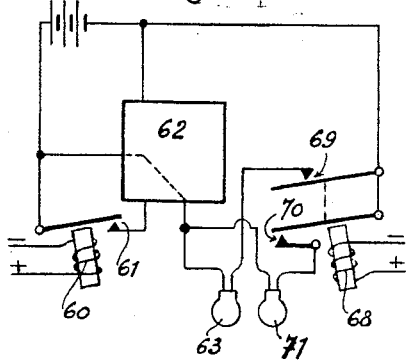
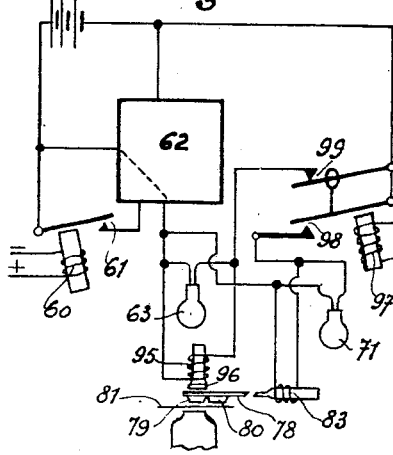
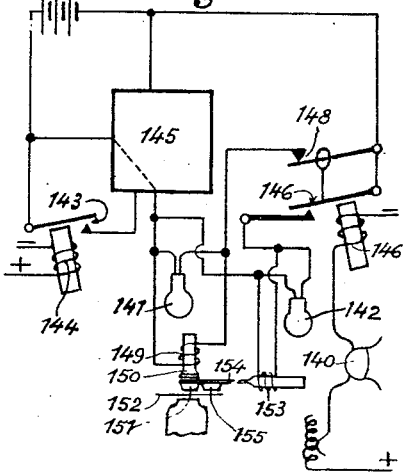
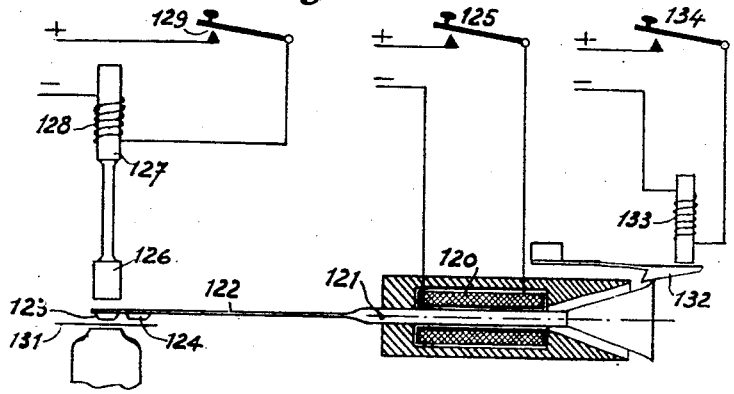
Inventor
Emile Piquerez
By Sommers & Young attys Aug. 10, 1943.  E. PIQUEREZ  2,326,168
APPARATUS FOR TESTING AND INDICATING THE CONDITION OF VEHICLE BRAKES
Filed Jan. 14, 1939  5 Sheets-Sheet 5
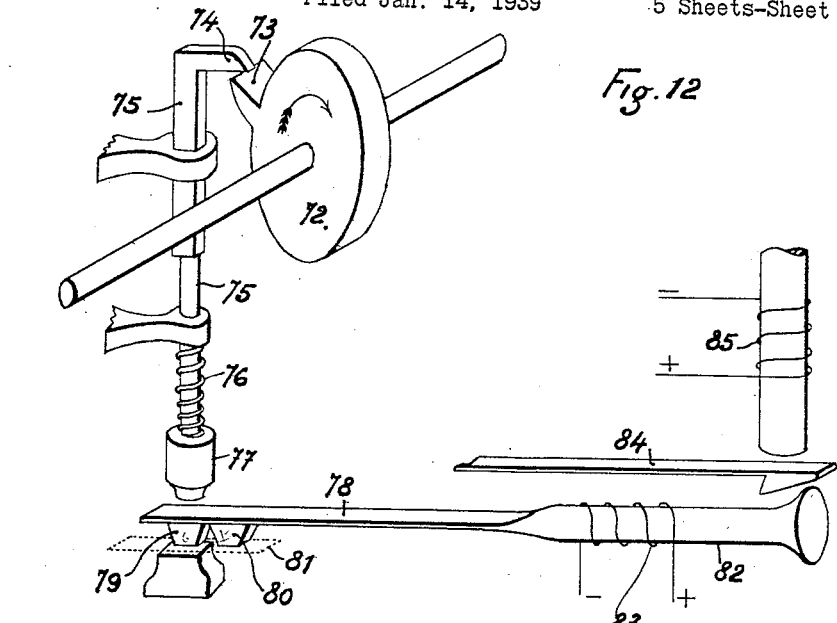
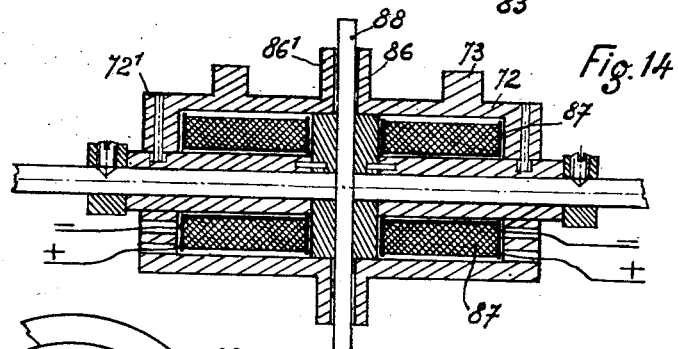
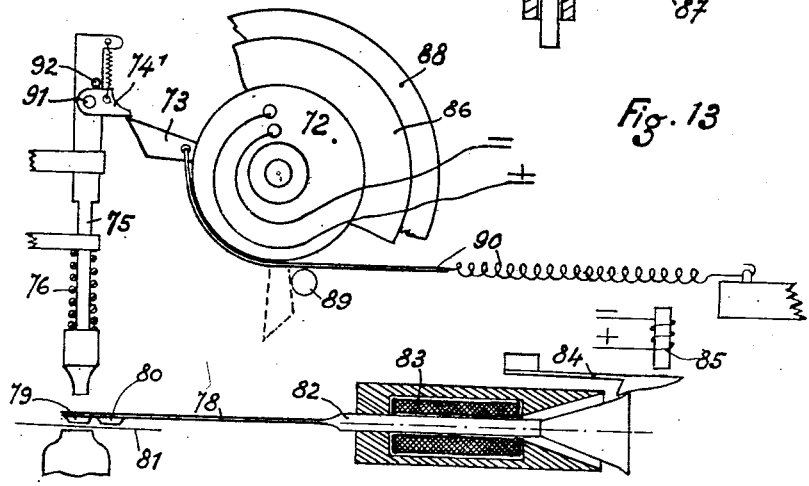
Inventor
Emile Piquerez
By Sommers & Young Attys Patented Aug. 10, 1943

2,326,168

UNITED STATES PATENT OFFICE 2,326,168

APPARATUS FOR TESTING AND INDICATING THE CONDITION OF VEHICLE BRAKES

Emile Piquerez, Saint-Cloud, France; vested in the Alien Property Custodian

Application January 14, 1939, Serial No. 251,010
In France January 18, 1938

3 Claims. (Cl. 73—51)

This invention relates to apparatus for checking motor and other vehicles and has for its object the provision of apparatus for the rapid checking of such vehicles in order to determine that they comply with the conditions essential for their safe operation.

An object of this invention is to provide a simple form of combined apparatus for performing certain required tests necessary to determine whether an automobile is in a proper condition of repair and adjustment with respect to certain features which are important to safe operation, such as the brakes, tire grip, steering, and lights.

In the drawings:

Figure 1 is a diagrammatic view showing the track and associated apparatus in longitudinal section;

Figures 2, 3 and 4 are transverse sections on the lines 2—2, 3—3, 4—4, respectively of Figure 1, Figures 5 and 6 are front sectional and side sectional views, taken to a larger scale, of the movable stop situated at the top of the inclined track;

Figure 10 is a diagram of a signalling device associated with one of the test paths;

Figure 11 is a diagram of another arrangement;

Figure 12 shows diagrammatically a registering device associated with one of the test paths;

Figure 13 is a diagram of another arrangement,

Figure 14 is a detail view of a magnetic clutch included in the device shown in Figure 13, Figure 15 is a diagram of a combined signalling and registering device;

Figure 16 shows diagrammatically a registering device for giving the result of the test of the steering of the vehicle.

Figure 17 is a diagram of a signalling and registering device associated with the photo-electric cell for testing the headlights.

Figure 7:
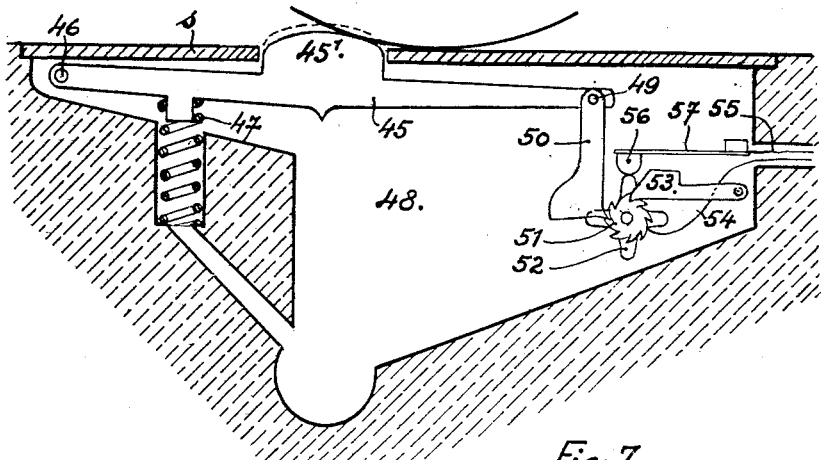
Figure 7 is a detail view, to a scale larger than that of Figure 1, of the contact at the start of one of the test paths.

As will be seen from the drawings, the apparatus according to the invention comprises principally a sloping track 1 (see Figure 1), the part of which included between the points A and B constitutes the test path for checking the brakes. This part A—B, which affords a maximum tire grip, is arranged to be traversed by the braked vehicle. In order to allow the tester to put on the brakes conveniently it is advantageous to stop the vehicle at the top of this path against a movable stop which is generally designated by 2 in Figure 1. With the same object, it is advantageous to provide an upward slope 3 in front of this stop to cause the vehicle to slow up before reaching the stop.

The tracks 1 and 3 can be arranged in any suitable manner, either by the adaptation of an already existing road or by means of a construction in stonework or in metal framing erected at the edge of a road.

The path A—B for testing the brakes is preferably followed, as already mentioned, by a path for testing the grip of the tires, which path can be arranged immediately afterwards, for example from B to C. This second path, which can be less inclined than the previous one, is provided with a surface giving a grip to the tires similar to that afforded by a road.

In addition to this second path, the track comprises an ascent 4 leading the vehicle back to the normal level N of the road. In order to ensure that the testing conditions remain constant, at least the part from A to C is protected by a tunnel constructed in any suitable manner. For example, the tunnel may consist of side walls and a metallic framework 5 (see Figures 1 to 4) supporting a roof 6, the whole being such that the track is in relative darkness, this permitting the testing of the headlights to be effected as well.

In the sunk part of the track the framework 5 is arranged above walls 7 which border this part up to the level N and the roof comes down on each side to this level. The movable stop 2 which may be of any suitable type is arranged, for example, as shown in Figures 5 and 6. It thus comprises a stop proper formed, for example, by a beam reinforced by U-irons 11 and provided in front with a rubber member 12 which is mounted across the track on arms 13, each of which is pivoted on a transverse axis 14. These arms which, under the action of their own weight, tend to drop with the beam into a gulley 15, are each maintained in an operative position by a locking arm 16 on which a tail 13a, extending from each arm below its pivot, abuts.

The locking member is advantageously constituted by a roller 17. Each arm 16 which carries one of these rollers, is pivoted about a horizontal axis 18 in such a manner as to be capable of pivoting in a plane perpendicular to the plane of movement of the arms 13.

All the arms 16 extend below their pivots in the form of tails 16a and all the tails 16a are connected to each other by a coupling bar 19 which consequently extends transversely of the track in the lower part of the pulley 15.

A transmission element such as a metallic cable in the form of a closed loop is attached to the two ends of the bar 19. This cable passes round guide pulleys 21, 22 and 23, and at its upper part passes round a driving pulley 24 to whose shaft 25 is fixed a toothed wheel 26 driven at a reduced speed by a pinion 27 operated by a crank 28. It will be understood that by operating the latter in one direction, the arms 16—16a will be pivoted to free the arms 13—13a from their locking members, thereby permitting the automatic withdrawal of the vehicle stop, while by reverse operation of the crank the said arms 16—16a are returned to their locking position shown in Figure 6.

It is however, necessary, previous to this second operation, to raise the arms 13. To do this there is provided another operating element such as a cable 29 which need be attached to 30 to only one of the arms 13, for example the center one, these arms being connected one with the other by the stop member 10—11. That part of the transmission element which is perpendicular to the support passes over the pulleys 31 and 32 is wound at its other end on a pulley 33 keyed to the shaft 25 which already carries the pulley 24.

The arrangement is such that, when the crank 28 is operated in a direction causing the stop arms 16 to disengage, the transmission cable 29 is unwound and consequently allows the arms 13 to drop under the action of their weight, while during reverse operation of the crank the transmission cable 29 is wound up and causes the raising of the arms 13, which is effected before the arms 16 are returned to the vertical position in which they lock the arms 13. To ensure this it is sufficient to arrange, for example, a spring in the transmission cable 29 this spring being adapted to stretch during the last part of the operation, starting from the time when the arms 13 are erected.

There will now be described the part of the apparatus which, in combination with the sloping track A—B, enables the braking of the vehicle to be tested and indicates the good or bad results of this test according as to whether the braked vehicle covers, under the action of its own weight, the path A—B in a time greater or less than the predetermined standard time which may be denoted by $t$.

Several different constructions are possible. In one construction, the result is indicated merely by a visual signal. To this end, there are provided, at the starting point A of the path and at the end point B, two contact members or switches 40 and 41, respectively (see Figure 1). Each contact member, which can be of any suitable type capable of being operated by the vehicle, may for example, be constructed as shown in detail in Figure 7. It then comprises a lever 45 pivoted at one end to a shaft 46 and having a boss $45^1$ which, under the action of a spring 47, normally projects slightly above the floor of the track, the whole arrangement being located in a small channel 48 which is covered by a plate $s$.

The other end of the lever 45 is pivotally connected at 49 with a pawl 50 which engages in a ratchet wheel 51 which rotates solidly with a star wheel 52. This star wheel has a number of fingers equal to half the number of teeth on the wheel 51. A second pawl 53 holds the wheel 51 against back rotation.

The wheel 52 is insulated and is connected by means of a conductor 54 to one of the poles of a source of current, the other pole being connected by a conductor 55 to a contact 56 carried by a strip 57 in such a manner that the circuit is closed when one of the fingers of the wheel 52 engages the said contact 56.

In the positions shown in Figure 7 the boss 45' and the lever 45 are half depressed under the action of the advancing wheel of the vehicle, and contact is made. When the lever is completely lowered this contact will be broken. Thus contact is successively made and broken during one depression of the lever, that is to say during the movement of one tooth of the wheel 51. A second depression of the lever 45 which is produced by the action of the back wheel of the vehicle will not, however, make any contact owing to the fact that the wheel 52 has only half the number of teeth of the wheel 51, and it will only bring the following finger of the wheel 52 into a position ready to make contact. This contact will be made when a third lowering of the lever 45 is effected under the action of the advancing wheel of another vehicle.

Figure 10 shows diagrammatically one example of an indicating device making use of a signalling circuit including the contacts 40 and 41. This device comprises a relay 60 adapted to be energised through the contact 40 and adapted to close an energising contact 61 of a time switch 62. This closes a circuit over the path $p$—$q$, as a result of which a lamp 63 will be lighted for a predetermined period equal to the standard time $t$ fixed for the covering of the path A—B.

The lamp 63 can be mounted, for example, on a post 65' (Figure 1) situated at the edge of the track a little beyond the point B, in such a way as to be easily visible to the driver when the latter passes the said point B. This end point may be marked by any suitable means.

Obviously, the signalling lamp or lamps can be duplicated, both in the present case and in those which will be hereinafter described, one series being arranged in sight of the driver and the other series being arranged in a hut in sight of a manager in charge of the station.

If, the vehicle takes time greater than the standard time to cover the path A—B, the extinction of the lamp 63 taking place before the passing of the point B by the vehicle will indicate that the braking is in order.

On the other hand, a relay 66 adapted to be energised through the contact 41 is adapted, when energised, to open a contact 67 and thus break the circuit of the lamp 63. If, then, the vehicle takes a shorter time than the standard time $t$ to cover the path A—B, the lamp is extinguished at the moment the point B is passed and this indicates that the brakes are defective.

Figure 11 shows diagrammatically another form of device giving the result of the comparison between the time taken and the standard time in the form of a signal. In this device, as in the previous one, a relay 60 adapted to be energised through the contact 40 produces the lighting of a lamp 63 through the intermediary of the contact 61 and of a time switch 62. If the vehicle covers the path A—B in a time greater than the standard time the lamp 63 is extinguished before the passing of the point B and it's extinction indicates that the braking of the vehicle is satisfactory.

But if, on the other hand the vehicle covers the path A—B in a time less than the standard time, the contact 41 situated at the point B energises a relay 68 which opens a contact 69 and closes a contact 70, causing the extinction of the lamp 63 and the lighting of another lamp 71 which is also mounted on the post 65', but gives a light of a different colour. Thus the lighting of the lamp 71 at the moment of the passing of the point B is indicative of the defectiveness of the brakes.

It is also an object of the invention to provide means for effecting the comparison of the standard time with the actual time taken to cover the path A—B and for indicating the result of this comparison by means of a registering device provided instead of or in conjunction with a signalling device such as one of those just described.

Figure 12 shows a construction of one such registering device. This device comprises a cam wheel 72 provided with a tooth 73, which wheel is rotated by suitable means in such a manner as to make one revolution during the standard time, the starting of the rotation of this wheel being effected by the contact 40 and its stopping being effected by a time switch set in operation by the said contact.

In the path of the tooth 73 of the cam wheel 72 is a projection 74 mounted on a rod 75. The latter, which is guided in any convenient manner, is arranged to compress a spring 76 when being raised under the action of the tooth 73.

The spring 76 will produce a quick downward movement of the rod 75 as soon as the tooth 73 has passed the projection 74.

The rod 75 is provided with a head 77, opposite the end of which is a long resilient reglet 78 carrying two conventional characters 79 and 80 such as "G" and "B," adapted to indicate the good or bad result of the test. These characters are arranged so as to act on a suitable fixed or movable support 81, such as a card or a paper band, to make an impression thereon either by perforation or by printing, an inking device naturally being provided in the latter case. At the time of striking the reglet 78 flexes under the action of the momentum of the striker 75—77, operated by the spring 76, and makes the impression. It returns resiliently and slightly lifts the rod 76—77, thus relieving the support 81.

The parts are so arranged that normally the character 79 ("G") of the reglet is opposite the rod 75—77 so that this character can be printed at the expiration of the standard time, the wheel 72 naturally beginning its rotation at the moment when the vehicle passes the starting point A of the test path. If, on the other hand, the vehicle covers this path in a time less than the standard time the device then imprints the character 80 ("B") in place of the character 79 ("G").

This can be brought about by, for example, attaching the reglet to the plunger core 82 of a solenoid 83 or to the armature of an ordinary electro-magnet, the energising circuit of which is adapted to be closed by the contact at the end of the test path, which would be the contact 41 for the testing of the brakes. A spring catch 84 is provided in order to retain the core 82 so long as the time switch, which was set in operation by the contact 41, is still closed.

It will be seen, therefore, that if the solenoid 83 is energised before the end of the standard time it will move the character 80 ("B") opposite the rod 75—77 so that this character will be printed on the support 81 at the moment of the dropping of the rod.

An electro-magnet 85 energised through the contact 40 at the beginning of each test and adapted to attract the catch 84 will ensure the return of the core 82 and of the reglet 78 to their initial positions.

In another embodiment shown in Figures 13 and 14, the cam 72—73 is fixed to a plate 86 of magnetic metal which is included in the magnetic circuit of an electro-magnet 87 contained in the body of it, which circuit embraces a disc 88. This disc is permanently rotated at a uniform rate so that, on energising this electro-magnet by means of a time switch set in operation by the contact 40, the plate 86 is magnetically attracted to the disc 88 and in consequence the cam is rotated for a time equal to the standard time. The parts are so arranged that, during the course of this movement, the cam 72—73 leaving an abutment 89 raises the projection 74' of the rod 75 and lets the latter fall again at the end of the standard time. At this moment the cam wheel 72 is freed from the attraction of the disc 88 and returns to its original position under the action of a spring 90 which was stressed by the previous rotation of the cam wheel.

In this construction the projection 74' of the rod 75 is pivoted to the latter by means of a pin 91 in such a manner that the tooth 73 of the cam 72 can pass it during the return movement of the latter, whilst an abutment 92 locates this projection during the course of the raising of the rod.

If the vehicle covers the path A—B in a time less than the standard time $t$, the electro-magnet 83 is energised as in the preceding arrangement and ensures in the same way the impression of the character 80 ("B") in place of the character 79 ("G").

In this new construction, as in the preceding one, an electro-magnet 85, energised at the beginning of the test through the contact 40, ensures the disengagement of the catch 84 and consequently the return of the core 82 and of the reglet 78 to their initial positions, assuming that they have been previously displaced for the impression of the sign 80 ("B").

As has been said, the apparatus can comprise at the same time signalling means and registering means for comparing the standard time with the actual time taken by the vehicle to cover the test path and for indicating the result of the comparison, it being possible to combine these two means.

Figure 15 shows diagrammatically and by way of example an arrangement for doing this, comprising the combination of signalling means and registering means of the previously described kinds. In this construction a relay 60, energized through the starting contact 40, closes a contact 61 which starts a time switch 62 ensuring, for a time equal to the standard time, the lighting of a lamp 63 and the energization of an electro-magnet or of a solenoid 95 which raises, and retains raised against the action of a spring, a striker 96, opposite which is normally arranged the character 79 ("G") carried by the reglet 78. This reglet is similar to those of the arrangements of Figures 12 and 13 and also carries the character 80 ("B").

If the time taken by the vehicle to cover the path A—B is greater than the standard time $t$, the lamp 63 is extinguished at the expiration of the standard time before the passing of the point B, and, simultaneously, the striker 96 falls rapidly effecting the impression of the character 79 ("G") on the support 81 which may be a paper band.

If the time taken by the vehicles to cover the path A—B is less than the standard time, a relay 97 energized through the contact 41 at the end of the passage closes, initially through the contact 98, the circuit of an electromagnet or of a solenoid 83, similar to those of the preceding figures, which displaces the reglet 78 and brings the character 80 ("B") opposite the striker 96. It then opens the contact 99 producing also the extinction of the lamp 63 and the falling of the striker 96 which imprints the character "B" on the support 81. The illumination of a lamp 71 gives the signal "bad."

For testing the grip of the tires, which is effected when covering the path from B to C (Figure 1), it being understood that it is again the question of a comparison between the actual time taken to cover this path and a new standard time $t'$, similar means can be used to effect this comparison and to indicate the result. In this case and supposing the two paths are disposed immediately following one another as in Figure 1, the functions which would be effected for the testing of the brakes by the contact 40 in combination with the devices of Figures 10 to 15, will for the testing of the grip of the tires, be fulfilled by the contact 41 in combination with devices similar to those previously described, whilst the aforesaid functions of the contact 41 will be performed, in the new arrangement, by a new contact 42 arranged at the point C, the time switch employed in the new arrangement naturally being arranged to open the circuit at the expiration of the time $t'$.

Thus, in the case of an arrangement enabling the grip of the tires to be tested comprising a signalling device of the type of Figure 10, the circuit of the relay 60 of this device will be closed by the contact 41, and that of the relay 66 will be closed by the contact 42. And if the installation comprises at the same time a device like that of Figure 10 for the testing of the brakes and another similar device for the testing of the grip of the tires, then the contact 40 will close the circuit of the relay 60 of the brake testing device, the contact 41 will close simultaneously the circuit of the relay 66 of the brake testing device and of the relay 60 of the tire grip testing device, and the contact 42 will close the relay 66 of the tire grip testing device. The signalling lamp or lamps can be mounted on a post 65² (Figure 1).

Similarly two registering devices, the first for the testing of the brakes and the second for the testing of the tire grip, can be used, these devices being similar to those already described.

In the case where these registering devices include the use of the magnetic coupling of Figure 14, the cam 72' of the device registering the result of the test of the tire grip and its plate 86' will be arranged on the opposite side of the disc 81 so that when the contact 41 is operated by the vehicle this plate 86' will couple with the disc 88 for a time equal to the second standard time $t'$.

As has been said, for the testing of the brakes and, also, advantageously for the testing of the tire grip, the present apparatus will advantageously comprise, besides the means already mentioned, means adapted to be operated by a resulting skidding of the vehicle in the path A—B and also in the path B—C to give, on this occurring, the indication of a bad result by signalling or by registering or by both.

Figure 8:
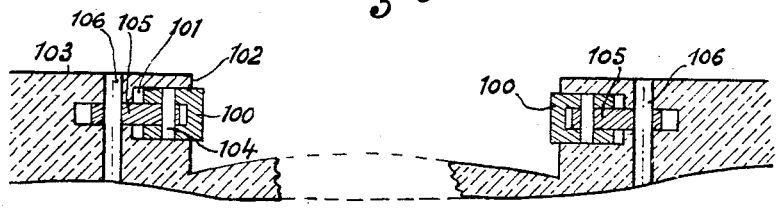
Figures 8 and 9 show in transverse section and in plan, the side contacts arranged at the edge of the test track.
Figure 9:
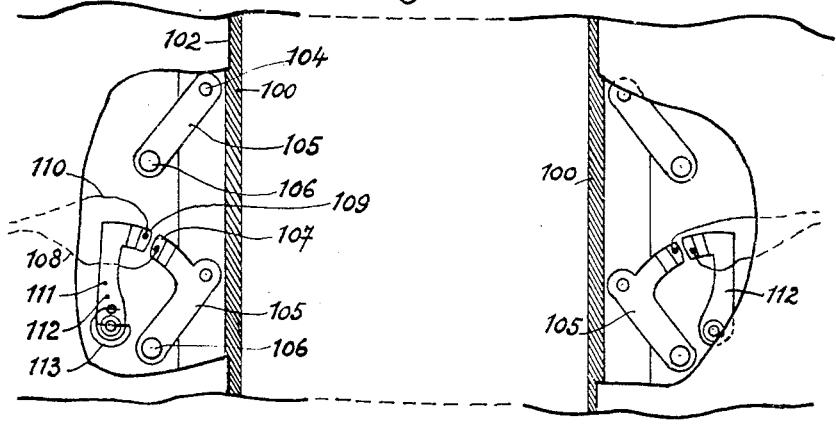

To this end the track 1 is bordered on each side from A to B by a contactor 43 and from B to C by a contactor 44, these contactors being adapted to function under the effect of a blow. These contactors, which can be of any suitable type, may, for example, be constructed as shown in Figures 8 and 9.

Each of them then comprises a rigid member 100 extending the length of the track and constituted, for example, by an iron U member which is adapted to slide horizontally, in a direction perpendicular to the length of the said track, within a housing 101 formed in the vertical face 102 of the edge of the track 103. The member 100 is pivoted by means of pins 104 to cranks 105 which for their part can be oscillated about fixed axes 106 fitted in the track. Springs are provided at intervals in order to ensure a rest position for this assembly in which the member 100 partially projects from the side 102 of the track.

One of the cranks 105 carries a contact part 107 connected to a conductor 108, while in the curved path of the contact 107 is another contact part 109 connected to another conductor 110. This contact is carried by an arm 111 pivoted at 112, and the device is lodged in an enlargement of the housing 101. The arm 111 is preferably resiliently maintained in its rest position, for example, by means of a spiral spring 113, so as to ensure the resiliency of the contact.

It will be understood that in order to obtain, by means of the contacts 43, the appearance of the signal "Bad" or the registration of the corresponding sign, it is sufficient to connect these contacts in parallel with the contact at the end of the brake test track which is already arranged to give this signal or to register this sign in combination with the device for testing the brakes.

Thus, for example, in the case where a device such as that of Figure 11 is employed for the testing of the brakes the contacts of the two contactors 43 will be connected in series with those of the contact 41 of the relay circuit 68. On the other hand in the case where a device such as that of Figure 15 or that of Figure 12 is used, the said contacts can be connected in parallel with the contact 41 in the relay circuit 97 (Figure 15) or in the electro-magnet circuit 83 (Figure 12). As there is no reason why skidding should occur at the end of the path and it could, consequently, ensue unexpectedly after the expiration of the standard time, this occurrence will always usefully operate with these devices to cause the signal "Bad" to appear and the sign "B" to be registered.

The adaptation of the contactors 44 to give the desired result will be effected in the same fashion, that is to say by connecting these contactors in parallel with the contact 42 at the end of the tire grip test track, which already produces, in combination with the device adopted for this test, the appearance of the bad signal or the registration of the corresponding sign.

As has been previously stated, before traversing the two tracks for testing the brakes and the grip of the tires the vehicle is brought to rest with its wheels pressing against the movable stop 2. This opportunity is advantageously utilised in order to examine the steering of the vehicle, the least play in the steering being, in these conditions, detected perfectly with operation of the wheel.

This operation being effected by the service tester in the presence of the driver of the vehicle, it is useless to provide a signalling device, unless it is desired to transmit the result to a distance, for example to another tester in a hut at the exit of the station, in which case it would simply be necessary to provide two lamps, one or the other being illuminated according to the good or bad result by means of a corresponding hand switch.

On the other hand it is advantageous in all cases to register this result.

To do this a device analogous to those already described can be used, save that it will not comprise a time switch and the contacts will be operated by the hand.

Figure 16 shows such a device. An electro-magnet or solenoid 120, the core 121 of which is integral with a flexible reglet 122, carries two characters 123 ("G") and 124 ("B") in order to indicate a good or bad result. The circuit of the magnet can be closed by means of a hand contact 125.

At rest, that is to say when the circuit is open, the character "G" is in front of a striker 126 which is suitably guided and is integral with the core 127 of a second electro-magnet or solenoid 128. This core is raised when the circuit is closed by means of a hand contact 129, to fall again immediately this contact is released. This applies the character "G" to a support 131 such as a card or a paper band.

After its bending due to the impact of the striker, the reglet 122 restores itself to its initial position and frees the support 131. If the result of the test is bad it is sufficient to operate, prior to the striking, the contact 125. Then it is the character 124 ("B") which is presented under the striker 126 in order to be imprinted, it being maintained in position either by a prolonged closure of the contact 125 or by an automatic catch which will be eventually disengaged, for example by means of a third electro-magnet 133 energised through a third contact 134.

As has been said the test tracks traversed by the vehicle are covered by a tunnel which, by protecting the various parts of the track from the weather, maintains their coefficients of friction at a substantially constant value and consequently permits, other things being equal, of like results being obtained at all times without it being necessary to modify the adjustment of the apparatus in respect of the standard times $t$ and $t'$.

This tunnel is also arranged, according to a further feature of the invention, in such a manner as to produce relatively complete darkness, giving thus conditions suitable for the test of the light beam emitted by the anti-dazzle headlights of the vehicle. It would be difficult to effect this test by day in the open air.

To effect this test according to the invention the apparatus already described would advantageously further comprise a photo-electric cell in combination with a signalling device, a registering device or both.

Adopting, for example, the point B as the start of the test track for the lights, the photo-electric cell which is generally designated by 140 in Figure 1 is arranged at a distance from this point and at a height above the level of the track such that the cell cannot be influenced by the light beam emitted by the lights if the top of the beam is at such a regulation height that the beam is non-dazzling.

The device for indicating the result of the test, which will be used in combination with the photo-electric cell, can consist of signalling or of registering means or both.

In order to give the indication in the form of a signal use can be made of a lamp 141 (Figure 17), arranged so as to light up at the moment of the passing of the starting point of the light test, which may be the point B in the example chosen, and to remain lighted during a certain time. This lamp indicates when the light beam is correct, while another lamp 142, giving a light of a different colour and which lights only if the cell is influenced by the said beam, and this after the extinction of the first, is provided to indicate when the beam is incorrect.

To this end the circuit of the lamp 141 can be closed by a contact 143 (Figure 17) controlled by a relay 144 energised through the contact 41 at the point B and a time switch 145. The circuit of the lamp 142 comprises a contact 146 adapted to be closed by a relay 147 which operates when the cell 140 is acted upon by the light beam, this relay ensuring first of all the extinction of the lamp 141 through the opening of a contact 148. This arrangement could be limited, as will be understood, to the single lamp 142 arranged in such a manner as only to give the signal of rejection when there is cause.

The above arrangement can comprise a registering device, for example of the kind already described, which is advantageously arranged as shown in Figure 17.

In this example a solenoid 149 is arranged to be energised at the same time as the lamp 141 and to raise then the striker core 150 below which is normally presented a character 151 "G" ("Good") in such a manner that this character is imprinted on the support 152, which may be a card or paper band, upon the dropping of this striker, which will be produced at the moment of the opening of the circuit by the time switch 145. But if the photo-electric cell 140 is acted upon by the light beam another solenoid 153 adapted to be energised at the same time as the lamp 142, displaces the flexible reglet 154 which, in addition to the character 151 ("G"), carries a character 155 ("B"="Bad"), and thus brings the character "B" under the striker 150, so that this character is impressed in place of the character "G".

It will be understood that if the cell 140 is influenced by the light beam this lasts the full time of the test and, consequently, the contact 146 is closed during all this time. Thus it follows that the character "B" is maintained in position under the striker till the moment of the impression. It is, therefore, useless to provide a locking device as in the case of Figures 12 and 13.

On the other hand as the influencing of the cell by the light beam, if it takes place at all, begins at the beginning of the test, it follows that the duration $t^2$ of the closing of the circuit, which is effected by the contactor 145, can be very short.

It will be easily understood from the description which has been given that all the test operations effected with the present apparatus are very rapid and will not, consequently, give any difficulty to the user who wishes to test his vehicle, for example at the beginning of a long journey.

It will be understood also, that it is possible to centralise all the registering devices in, for example, a hut such as 160 (Figure 1) at the exit of the station, where the registrations would be delivered to the driver of the vehicle. The electric cables leading to this hut could be enclosed in a channel 161 (Figure 3).

What I claim is:

1. Apparatus for testing motor vehicles comprising, an inclined track, a part of said track having a surface which affords to the tires of the vehicle a grip comparable with that afforded by a road, said part constituting a test path, printing means associated with said test path for printing a conventional sign when the tested vehicle, while braked, descends the said path under the action of its own weight in a time greater than a predetermined standard time $t$, and means for printing another conventional sign when the said vehicle descends said path in a time less than the time $t$, both of said printing means being located at a common supervision station.

2. Apparatus for testing motor vehicles comprising an inclined track, a part of said track having a surface which affords a strong grip to the tires of a vehicle, a printing device associated with said test path, said device comprising a reglet carrying two conventional signs, a striker arranged above the reglet in order to produce an impression on striking the reglet, said reglet normally presenting one of the signs below the striker, means operated by the vehicle passing the starting point of the path for causing the striker to strike the reglet at the end of a predetermined time $t$ assigned to the vehicle under test to descend the said path when braked under the action of its own weight and means for causing the reglet to present the second conventional sign below the striker when the said vehicle descends this path in a period of time less than the predetermined time $t$, and for maintaining this reglet in this new position until the expiration of the time $t$.

3. Apparatus for testing motor vehicles comprising, an inclined track, a part of the surface of said track having a strong grip to the tires of a vehicle, means for comparing with a predetermined time $t$, the time taken by a braked vehicle to descend said part of the track under the action of its own weight, means operated by the vehicle passing along said track for setting said time-comparing means in operation, means for automatically indicating the good or bad result of this comparison according to whether the vehicle traverses said part of the track in a time greater or less than the time $t$, and means operated by the vehicle for indicating a bad result in all cases when the vehicle skids while traversing said part of the track.

EMILE PIQUEREZ.